(12) United States Patent
Zhang et al.

(10) Patent No.: US 8,017,229 B2
(45) Date of Patent: Sep. 13, 2011

(54) POLYURETHANE COMPOSITE, ITS PREPARATION AND USE

(75) Inventors: Chenxi Zhang, Shanghai (CN); Jen-Chieh Lin, Shanghai (CN); Chi-Kwong Chow, Taiwan (CN); Xiang Wang, Shanghai (CN)

(73) Assignee: Bayer MaterialScience AG, Leverkusen (DE)

( * ) Notice: Subject to any disclaimer, the term of this patent is extended or adjusted under 35 U.S.C. 154(b) by 783 days.

(21) Appl. No.: 11/663,815

(22) PCT Filed: Sep. 26, 2005

(86) PCT No.: PCT/CN2005/001571
§ 371 (c)(1),
(2), (4) Date: Mar. 12, 2008

(87) PCT Pub. No.: WO2006/034640
PCT Pub. Date: Apr. 6, 2006

(65) Prior Publication Data
US 2008/0261022 A1     Oct. 23, 2008

(30) Foreign Application Priority Data
Sep. 28, 2004   (CN) .......................... 2004 1 0066715

(51) Int. Cl.
*B32B 27/40* (2006.01)
*C08J 9/08* (2006.01)

(52) U.S. Cl. ............... 428/319.3; 428/314.4; 428/314.8; 428/318.4; 264/54

(58) Field of Classification Search ............... 428/318.4, 428/319.3, 319.7, 314.4, 314.8; 264/54
See application file for complete search history.

(56) References Cited

U.S. PATENT DOCUMENTS

| | | | |
|---|---|---|---|
| 5,288,442 A | 2/1994 | Bauvois ........................ 264/45.2 |
| 5,395,580 A | 3/1995 | Morita et al. ................. 264/266 |
| 5,530,989 A | 7/1996 | Remmert et al. ........... 16/110 R |
| 6,450,572 B1 | 9/2002 | Kuipers et al. | |
| 6,863,953 B2 | 3/2005 | Toshimasa et al. | |
| 7,576,137 B2 | 8/2009 | Gansen et al. | |
| 2003/0164629 A1 | 9/2003 | Bigolin et al. | |
| 2004/0077740 A1 | 4/2004 | Brecht et al. | |

FOREIGN PATENT DOCUMENTS

| | | |
|---|---|---|
| GB | 2224248 A | 5/1990 |
| JP | 1 299 242 A | 12/1972 |
| JP | 19830174701 | 9/1983 |
| JP | 60-066712 A | 4/1985 |
| JP | 2-257909 A | 10/1990 |
| JP | 2-286308 A | 11/1990 |
| JP | 3-175009 A | 7/1991 |
| JP | 05-057735 A | 3/1993 |
| JP | 6-218738 A | 8/1994 |
| JP | 2001-163991 A | 6/2001 |
| JP | 2001-342284 A | 12/2001 |
| JP | 2003-211612 A | 7/2003 |
| WO | WO 99/37459 A1 | 7/1999 |
| WO | WO2004/035648 | 4/2004 |

OTHER PUBLICATIONS

Office Action from corresponding Japanese Patent Application No. 2007-533854 mailed Apr. 5, 2011.
Extended European Search Report from corresponding EP Application No. 05791954.0 mailed Apr. 7, 2011.

*Primary Examiner* — Hai Vo
(74) *Attorney, Agent, or Firm* — Connolly Bove Lodge & Hutz LLP

(57) ABSTRACT

A polyurethane composite is disclosed comprising rigid polyurethane and foamed thereupon a flexible integral skin (surface pore closed) polyurethane foam, wherein the rigid polyurethane having a density range of 600 kg/m$^3$ to 1200 kg/m$^3$, a Shore A hardness range of 90 to 99, a Shore D hardness range of 40 to 80, a tensile strength range of 10MPa to 60 MPa, a flexural strength range of 20 MPa to 60 Mpa, a elastic flexural modulus range of 800 MPa to 2500 Mpa, an elongation rate at break of 10-100% and an elongation at break of 25-150%; wherein the flexible integral skin (surface pore closed) polyurethane foam having a density range of 60 kg/m$^3$ to 200 kg/m$^3$, a tensile strength of 60 kPa to 250 kPa, an elongation at break of 70-180%, a tearing strength of 130-220 N/m, a resilience of falling ball of 40-70%, IFD25% of 200-600 N and IFD65% of 600-1800 N.

19 Claims, No Drawings

POLYURETHANE COMPOSITE, ITS PREPARATION AND USE

TECHNICAL FIELD

The present invention relates to a polyurethane composite, the preparation method thereof and its usage in, for example, preparing bicycle saddle and decorative materials.

BACKGROUND

The present bicycle saddles generally have the following two structures:

(1) a structure comprising a polypropylene liner, laminated thereon an open pore polyurethane foam and a polyurethane/PVC outmost layer; or (2) a structure comprising a polypropylene liner and an integral (surface pore closed) polyurethane foam.

The polypropylene liner is used for support load and resistance to impact, while the polyurethane outmost layer is for softness, comfortability and resistance to wear. During manufacturing, at first, the polypropylene and polyurethane are generally formed into a required shape, respectively, and then they are adhered together. To improve the adhesion, the surface of the polypropylene liner must be surface treated for coarsening or by, for example, flame, etc.

There are the following deficiencies in the bicycle saddles made in such a process:

1. Due to the manual operation, the surface treatment of the polypropylene liner is hardly completely carried out, resulting in the liner and the polyurethane not being sufficiently adhered, and, in turn, resulting in high rejection rate. In addition, the productivity of producing the saddle is low;

2. On using for a period of time, the saddles made by adhering polypropylene liner and polyurethane foam may be adhesion failure at the bottom thereof as a result of abrasion between the saddle and the leg of rider, shortening the duration thereof;

3. Besides the cost, the use of adhesive may cause problems on environment;

4. With the increase in the awareness of environmental protection and the increasing sternness of the environmental laws, provisions aiming at "producers being responsible for recycling and treatment" have been enacted in many countries, namely, the producers are required to recycle and treat waste plastics (including plastic saddles). Presently, the recycle of saddles includes splitting the polypropylene liner from the polyurethane outmost layer, and then respectively treating same. Such a method is difficult to carry out mechanically in large-scale. In addition, a great deal of labor and resources are requires, for example, in the split procedures, thus increasing the cost of production.

One object of the present invention is to resolve the above mentioned technical problem that exists for a long time, substituting the polypropylene containing material with a polyurethane composite, thus simplifying the producing process, increasing the productivity and qualification rate, and avoiding the use of adhesive to reduce the environmental problems caused thereby.

Another object of the present invention is to provide a process for producing said polyurethane composite, which is free of the deficiencies brought about by the manual operation during the surface treatment of polypropylene materials.

A further object of the present invention is to provide usage of the polyurethane composite in producing bicycle saddles and decorative materials.

SUMMARY OF THE INVENTION

In accordance with one embodiment of the present invention, there is a polyurethane composite comprising, as a linear, a layer of rigid polyurethane and a layer of integral (surface pore closed) flexible polyurethane foam directly foamed on the surface of the rigid polyurethane liner;

wherein the rigid polyurethane is a reaction product of polyisocyanate, polyether polyols/polyester polyols and chain extender, the density of the rigid polyurethane is 600-1200 kg/m$^3$, Shore D hardness is 40-80, tensile strength is 10-60 MPs, flexural strength is 20-60 MPa, elastic flexural modulus is 800-2500 MPa and elongation at break is 25-150%;

the flexible integral (surface pore closed) or HR polyurethane foam is a reaction product of diisocyanate/polyisocyanate and polyols at the presence of water as a blowing agent, the density thereof is 60-180 kg/m$^3$, tensile strength is 60-250 kPa, elongation at break is 70-180%, tearing strength is 130-220 N/m, a resilience of falling ball is 40-70%, IFD 25% is 200-600 N and IFD65% is 600-1800 N.

In accordance with another embodiment of the present invention, there is a process for producing the polyurethane composite comprising the steps of:

(1) adding into an upper die of a composite mould polyisocyanate, polyether polyol or polyester polyol and chain extender, to form a liner of rigid polyurethane;

(2) adding into a lower die of the composite mould a mixture of diisocyanate/polyisocyanate, polyol and water, as a blowing agent, for forming said flexible polyurethane foam;

(3) closing the composite mould, allowing the flexible polyurethane to directly foam on the surface of the liner of the rigid polyurethane, forming a layer of flexible integral (surface pore closed) polyurethane foam thereon.

PREFERRED EMBODIMENTS OF THE INVENTION

The invention will be further described in light of the preferred embodiments thereof.

In one aspect, the present invention provides a polyurethane composite, comprising a layer of rigid polyurethane as the liner and directly foamed thereon a layer of flexible polyurethane foam.

The rigid polyurethane of the polyurethane composite of the present invention is a reaction product of polyisocyanate, polyether polyol and/or polyester polyol and chain extender.

The polyisocyanate is a conventional one, the non-restrictive examples thereof are, for example, toluene diisocynate such as 2,4-toluene diisocynate and 2,6-toluene diisocynate, and diphenylmethane diisocyanate such as diphenylmethane 4,4'-diisocyanate as well as its modified product having NCO contents of between 18% and 33.6%.

The polyisocyanate used for the liner of the rigid polyurethane of the present invention is commercial available, the non-restrictive examples thereof are, for example:

those obtained from Bayer in the name of SBU J243, Desmodur 3133, Desmodur 3230, Desmodur 44P01, Desmodur PU1511L and Desmodur 44V20;

Those from Dow Chemicals in the name of PAPI M227, ISONATE M 143;

that from BASF in the name of Lupranate M 20 S; and that from Huntsman in the name of SUPRASEC 5005.

The non-restrictive examples of the suitable polyether polyols in the present invention are, for example, polyether glycol having a functionality of 2-8, preferably 2-6 and hydroxyl value of 20-800 which is formed by employing propylene glycol, ethylene glycol, glycerin, trimethylolpropane, pentaerytiritol, sucrose, sorbitol, ethylenediamine or tolylene diamine, and the like as the raw materials. A preferred hydroxyl value of the polyether polyol is 100-700.

The non-restrictive examples of the polyester polyol are, for example, condensation polymers having a main chain obtained by the condensation polymerization of adipic acid and/or phthalic anhydride with ethylene glycol, propylene glycol, glycerin, trimethylolpropane, 1,4-butandiol, 1,6-hexylene glycol, pentanediol, or the like, said condensation polymers have functionality of 2-4 and a hydroxyl value of 50-500.

Suitable polyether polyols/polyester polyols is commercial available, the non-restrictive examples thereof are, for example, those obtained from Bayer in the name of Baydur CSP EF 0801-1, Baydur TTPU601 K20B and Baydur PU 85BD04.

The chain extenders suitable in the present invention are, for example dihydric alcohol, trihydric alcohol and diamine. The non-restrictive examples of the dihydric/trihydric alcohol extender comprise, for example, ethylene glycol, butandiol, glycerin, trimethylolpropane, diethylene glycol, and dipropylene glycol; the non-restrictive examples of the diamine extender are, for example, aromatic diamine or aliphatic diamine, such as ethylenediamine and tolylene diamine and the like.

In the rigid polyurethane of the polyurethane composite of the present invention, the molar ratio of the polyisocyanate and the polyol is 100-130:100, preferably 105-120:100, and more preferably 108-115:100.

The rigid polyurethane of the polyurethane composite of the present invention has a density of 600-1200 kg/m$^3$, preferably 1000-1200 kg/m$^3$; Shore A hardness of from 90 to 99, preferably from 95 to 98; Shore D hardness of from 40 to 80, preferably from 65 to 75; tensile strength of from 10 MPa to 60 MPa, preferably from 35 to 45 MPa; elongation at break of from 10% to 25%, preferably from 12% to 20%.

If necessary, additional additives may be added to the rigid polyurethane of the polyurethane composite of the present invention. The additives may be, for example, flame retardant, such as tri(2-chloroethyl)phosphate (TECP), tri(1,3-dichloro-2-propyl)phosphate, tri(1-chloro-2-propyl)phosphate (TCPP) and dimethy propyl phosphate (DMPP).

The polyurethane composite of the present invention further comprises a flexible integral (surface pore closed) polyurethane foam, which is a reaction product of diisocyanate and polyol at the presence of water as a blowing agent.

The diisocyanate is a conventional one, the non-restrictive examples thereof are, for example, 2,4-toluene diisocynate, 2,6-toluene diisocynate, hexamethylene diisocyanate, tetramethylene diisocyanate, naphthalene diisocyanate, and diphenylmethane diisocyanate. The preferred diisocyanate is selected from the group consisting of diphenylmethane diisocyanate (MDI), its modified products having NCO content of from 24% to 33%, preferably from 18% to 30%, and a mixture of diphenylmethane diisocyanate (MDI) and toluene diisocynate (TDI) having a NCO content of from 26% to 42%, preferably from 30% to 40%.

The polyol has a functionality of from 2 to 4, a hydroxyl value of from 18 to 60, preferably from 20 to 50. In a preferred embodiment, the polyol is a polyol grafted with more than one monomer. A non-restrictive example of the polyol grafted with more than one monomers is one having a functionality of from 2 to 4, a hydroxyl value of from 18 to 25 and a solid content of from 20% to 46% (polystyrene PS, polyacrylonitrile PA, polyurea).

The polyol used to form the flexible polyurethane foam is commercial available. The non-restrictive examples thereof are, for example, those obtained from Bayer in the name of Bayfit 2856-LY, Bayfit HM 1124 and Bayfit 2873-LY.

The polyol system used to form the flexible integral (surface pore closed) polyurethane foam of the present invention comprises from 0.4% to 1.0%, preferably from 0.6% to 0.8% by weight of water in terms of the total amount of the polyol system. During polymerization, the water acts as a blowing agent.

The flexible integral (surface pore closed) or HR polyurethane foam of the present invention has a density of from 60 kg/m$^3$ to 180 kg/m$^3$, preferably from 70 kg/m$^3$ to 150 kg/m$^3$, a tensile strength of from 60 kPa to 250 kPa, preferably from 80 kPa to 200 kPa; an elongation at break of from 70% to 180%, preferably from 87% to 160%; a tearing strength of from 130 N/m to 220 N/m, preferably from 150 N/m to 200 N/m; a resilience of falling ball of from 40% to 70%, preferably from 50% to 65%; IFD25% of from 200 N to 600 N, preferably from 300 N to 500 N and IFD65% of from 600 N to 1800 N, preferably from 900 N to 1100 N.

An UV stabilizer can be added into the flexible polyurethane foam of the polyurethane composite of this invention. The UV stabilizer does not limit to any special varieties, it can be any one of the conventional UV stabilizers. The non-restrictive examples thereof are, for example, Irganox 565 (2-(4-hydroxyl-3,5-di-ter-butyl aniline)-4,6-di(n-hexylthio)-1,3,5-triazine, etc.

If necessary, other additives can be added into both of the rigid and flexible polyurethane foams of the present composite. The additives can be, for example, flame retardant such as tri(2-chloroethyl)phosphate (TECP), tri(1,3-dichloro-2-propyl)phosphate, tri(1-chloro-2-propyl)phosphate (TCPP), and dimethyl propyl phosphate (DMPP); colorant, foam stabilizer, and the like. Those skilled in the art can easily determine the appropriate additives according to the requirements.

In another aspect, the invention provides a process for producing the polyurethane composite, which comprises the following steps:

(1) adding into an upper die of a composite mould a blend of polyisocyanate and polyol, closing the die for 2-6 minutes, and opening the die to obtain a liner of rigid polyurethane;

As used herein, the "composite mould" refers to a mould having an upper die and a lower die, wherein the upper die can be used to form an article, usually a liner of rigid polyurethane, having certain shape; while the lower die can hold a reaction mixture of polyurethane foam such that, after closing the mould, the flexible polyurethane foam can be formed directly on the surface of the liner of the rigid polyurethane.

The shape of the upper die depends on the final usage. In the case of the polyurethane composite being for bicycle saddle, the shape of the upper die should correspond to that of the bicycle saddle such that, after closing the mould, the flexible polyurethane foam in the lower die can be directly foamed on the surface of the rigid polyurethane liner, forming a foamed surface layer. In the case of the polyurethane composite being for decorative materials such as covering panel for a column, the shape of the upper die should correspond to the shape of the circular arc of the column. In practice, the positions of the upper and lower dies can be interchanged from each other.

(2) adding into the lower die of the composite mould a blend of diisocyanate and polyol for forming the flexible integral (surface pore closed) polyurethane foam.

(3) closing the composite mould to allow the flexible integral (surface pore closed) polyurethane to directly foam on the rigid polyurethane liner.

As mentioned above, the polyurethane composite of the present invention comprises a rigid polyurethane, which can support a load and withstand an impact, and a flexible integral (surface pore closed) polyurethane foam directly foamed thereon. When used, for example, to form a bicycle saddle, the rigid polyurethane provides the performance of impact resistance and supports the load, while the flexible integral (surface pore closed) polyurethane foam provides comfortability and wear resistance. Such a polyurethane composite clears away the deficiency in the prior art that the surface of the polypropylene liner should be treated manually, thus increasing the productivity and yield. In addition, because of the two consistent polyurethanes, it is not necessary for the polyurethane composite of the present invention to be split during recycling, thus decreasing the cost of labor and being suitable for large-scale production. Furthermore, because the polyurethane composite is free of adhesive, the cost of the adhesive can be deducted and the inadvantageous effect on the environment can be taken off. On the other hand, when used as decorative materials (for example, decorative wall panels), besides the soft feeling, the flexible polyurethane foam surface of the present invention has a property of sound absorption. Therefore, it can replace the decorative fabric to achieve the effect of fire prevention and reduction of cost.

The invention is further described in light of the examples as follows:

EXAMPLE 1

Preparation of Rigid Polyurethane Foam

Component A:
SBU J243, modified MDI-modified polyphenylmethanediisocyanate, obtained from Bayer (China) Limited

| NCO % | 32% |
|---|---|
| Viscosity 25° C. | 25 mPa · s |

Component B:
Baydur CSP EF0801-1, obtained from Bayer (China) Limited

| Hydroxyl value | about 370 mg KOH/g |
|---|---|
| Water content | <0.15 wt % |
| Viscosity (25° C.) | about 1,700 mPa · s |

100 parts by weight of Baydur CSP EF0801-1 (component B, a polyether blend) is mixed with 100 parts by weight of SBU J243 (component A, reaction index being 110) at room temperature for 10 seconds, pouring the blend obtained into a composite mould having been pre-heated to 50° C., closing the mould for 10 minutes and demoulding. The molded article has the following properties:

| Item | Value | Standards implemented |
|---|---|---|
| Density (kg/m$^3$) | 1180 | DIN 53479 |
| Elastic flexural modulus [MPa] | 2200 | DIN 53457 |
| Tensile strength (MPa) | 45 | DIN 53455 |
| Elongation at break (%) | 16 | DIN 53455 |
| Impact strength [kJ/m$^2$] | 46 | DIN 53453 |
| Shore D hardness | 77 | DIN 53505 |

EXAMPLE 2

Preparation of the Rigid Polyurethane Foam

Component A:
Desmodur 44P01, modified MDI-modified polyphenylmethanediisocyanate obtained from Bayer (China) Limited

| Properties | Nominal value | Unit |
|---|---|---|
| NCO content | 19.0 ± 0.5 | wt % |
| Viscosity to DIN 35015 25° C. | 140 ± 30 | mPa · s |
| Acid value | <400 | ppm HCL |

Component B:
Baydur TP.PU 60IK20, obtained from Bayer (China) Limited

| Properties | Nominal value | Unit |
|---|---|---|
| Hydroxyl value | 515 ± 25 | mg KOH/g |
| Water content | 0.55 ± 0.1 | wt % |
| Viscosity (25° C.) | 1,450 ± 200 | mPa · s |

100 parts by weight of Baydur TP.PU 60IK20 mixture (component B) is blended with 140 parts by weight of Desmodur 44P01 (component A, reaction index being 110) in a high-pressure machine, the typical processing conditions thereof are:

Temperature of raw materials [POL/ISO] (° C.): 30-35/30-35

Pressure on raw materials [POL/ISO] (MPa) about 15/about 15

Temperature of mould (° C.): 60-70

Duration of injection (s)<5

After moulding for 10 minutes, demoulding the article obtained, it has the following properties:

| Item | Value | Standards implemented |
|---|---|---|
| Density (kg/m$^3$) | 600 | DIN 53479 |
| Elastic flexural modulus [MPa] | 900 | DIN 53457 |
| Tensile strength (MPa) | 20 | DIN 53455 |
| Elongation at break (%) | 12 | DIN 53455 |
| Impact strength [kJ/m$^2$] | 15 | DIN 53453 |
| Shore D hardness | 67 | DIN 53505 |

EXAMPLE 3

Preparation of the Rigid Polyurethane Foam

Component A:
Desmodur PU 1511L, modified MDI, obtained from Bayer (China) Limited

| NCO % | about 31% |
|---|---|
| Viscosity 25° C. | about 120 mPa · s |

Component B:
Baydur PU 85BD04, obtained from Bayer (China) Limited

| | |
|---|---|
| Hydroxyl value | about 370 mg KOH/g |
| Water content | <0.15 wt % |
| Viscosity 25° C. | about 1,700 mPa · s |

100 parts by weight of Baydur PU 85BD04 polyether mixture (component B) is blended with 100 parts by weight of Desmodur PU1511L (component A, reaction index being 110) at room temperature for 10 seconds, pouring the blend obtained into a composite mould which has been pre-heated to 50° C., closing the mould for 10 minutes and demoulding. The article obtained has the following properties:

| Item | Value | Standards implemented |
|---|---|---|
| Density (kg/m$^3$) | 1180 | DIN 53479 |
| Elastic flexural modulus [MPa] | 2300 | DIN 53457 |
| Tensile strength (MPa) | 52 | DIN 53455 |
| Elongation at break (%) | 18 | DIN 53455 |
| Impact strength [kJ/m$^2$] | 45 | DIN 53453 |
| Shore D hardness | 80 | DIN 53505 |

EXAMPLE 5

Preparation of the Flexible Polyurethane Foam

Component A:
SBU J243, modified MDI-modified polyphenylmethane-diisocyanate, obtained from Bayer (China) Limited

| | |
|---|---|
| NCO % | about 32% |
| Viscosity 25° C. | about 25 mPa · s |

Component B:
Bayfit 2856-LY, obtained from Bayer (China) Limited

| | |
|---|---|
| Hydroxyl value | about 33 mg KOH/g |
| Water content | about 2.5 wt % |
| Viscosity 25° C. | about 1,100 mPa · s |

100 parts by weight of Bayfit 2856-LY polyether mixture (component B) is blended with 35 parts by weight of SBU J243 (component A, reaction index being 90) at room temperature for 7 seconds, pouring the blend obtained into a composite mould which has been pre-heated to 45° C., closing the mould for 10 minutes, and demoulding. The article obtained has the following properties:

| Item | Value | Standards |
|---|---|---|
| Density (kg/m$^3$) | 69 | DIN 53420 |
| Tensile strength (KPa) | 73 | DIN 53571 |
| Elongation at break (%) | 100 | DIN 53571 |
| Tearing strength (N/m) | 200 | DIN 53571 |
| 25% CLD (KPa) | 3.6 | — |
| 65% CLD (KPa) | 9.6 | — |
| Resilience of falling ball | 61 | — |

EXAMPLE 5

Preparation of the Flexible Polyurethane Foam

Component A:
SBU J243, modified MDI-modified polyphenylmethane-diisocyanate, obtained from Bayer (China) Limited

| | |
|---|---|
| NCO % | about 32% |
| Viscosity 25° C. | about 25 mPa · s |

Component B:
Bayfit HM 1124, obtained from Bayer (China) Limited

| | |
|---|---|
| Hydroxyl value | about 29 mg KOH/g |
| Water content | about 1.0 wt % |
| Viscosity 25° C. | about 1,100 mPa · s |

100 parts by weight of Bayfit HM 1124 polyether polyol mixture is blended with 18.5 parts by weight of SBU J243 (component A, reaction index being 90) at room temperature for 7 seconds, pouring the blend obtained into a composite mould which has been pre-heated to 45° C., closing the mould for 10 minutes, and demoulding. The article obtained has the following properties:

| Item | Value | Standards |
|---|---|---|
| Density (kg/m$^3$) | 150 | DIN 53420 |
| Tensile strength (KPa) | 150 | DIN 53571 |
| Elongation at break (%) | 158 | DIN 53571 |
| Tearing strength (N/m) | 180 | DIN 53571 |
| 25% IFD (N) | 380 | — |
| 65% IFD (N) | 1126 | — |
| Resilience of falling ball (%) | 52 | — |

EXAMPLE 6

Preparation of the Flexible Polyurethane Foam

Component A:
SBU J243, modified MDI-modified polyphenylmethane-diisocyanate obtained from Bayer (China) Limited

| | |
|---|---|
| NCO % | about 32% |
| Viscosity 25° C. | about 25 mPa · s |

Component B:
Bayfit 2873-LY, obtained from Bayer (China) Limited

| | |
|---|---|
| Hydroxyl value | about 33 mg KOH/g |
| Water content | about 0.8 wt % |
| Viscosity 25° C. | about 1,100 mPa · s |

100 parts by weight of Bayfit 2873-LY polyether mixture (component B) is blended with 16 parts by weight of SBU J243 (component A, reaction index being 90) at room temperature for 7 seconds, pouring the blend obtained into a composite mould which has been pre-heated to 45° C., closing the mould for 10 minutes, and demoulding. The article obtained has the following properties:

| Item | Value | Standards |
| --- | --- | --- |
| Density (kg/m³) | 150 | DIN 53420 |
| Tensile strength (KPa) | 225 | DIN 53571 |
| Elongation at break (%) | 87 | DIN 53571 |
| Tearing strength (N/m) | 220 | DIN 53571 |
| 25% IFD (N) | 570 | — |
| 65% IFD (N) | 1650 | — |
| Resilience of falling ball (%) | 61 | — |

EXAMPLE 7

Production of Bicycle Saddle

In an upper die of a composite mould used for producing bicycle saddle, a rigid polyurethane is prepared as described in example 1, except the rigid polyurethane formed is not demolded, namely, left it in the upper die. Into the lower die of said composite mould the reaction mixture as mentioned in example 4 is added, closing the mould for 10 minutes, and demolding to obtain a bicycle saddle made of the composite of the present invention, which has the properties of both the rigid polyurethane and flexible polyurethane of the present invention.

EXAMPLE 8

Preparation of Decorative Materials for Covering Column

In a circular arc mould, a polyurethane composite is produced by the process as described in example 7, except the rigid polyurethane described in example 2 and the flexible polyurethane described in example 6 are used. Composite of arc shape was obtained after demolding.

What is claimed is:

1. A polyurethane composite comprising a layer of rigid polyurethane as a liner and a layer of flexible integral polyurethane foam foamed directly on the rigid polyurethane liner wherein the flexible integral polyurethane foam is surface pore closed;
   wherein the rigid polyurethane is a reaction product of a polyisocyanate and a polyol selected from the group consisting of trihydric alcohol, tetrahydric alcohol and penthydric alcohol, the rigid polyurethane has a density of from 600 kg/m³ to 1200 kg/m³ and a Shore D hardness of from 40 to 80;
   the flexible polyurethane foam is a reaction product of diisocyanate and polyol at the presence of water as a blowing agent, the flexible polyurethane foam has a density of from 60 kg/m³ to 200 kg/m³, a tensile strength of from 60 kPa to 250 kPa, an elongation at break of from 70% to 180%, a tearing strength of from 130 N/m to 220 N/m.

2. The polyurethane composite of claim 1, wherein the polyisocyanate and polyol are present in the rigid polyurethane in a molar ratio of 105-130:100.

3. The polyurethane composite of claim 1, wherein the polyisocyanate for forming the rigid polyurethane is selected from the group consisting of 2,4-toluene diisocyanate, 2,6-toluene diisocyanate, hexamethylene diisocyanate, tetramethylene diisocyanate, naphthalene diisocyanate, 4,4'-diphenylmethane diisocyanate, and the modified products of the diphenylmethane diisocyanate having NCO content of from 18% to 33.6%;
   the polyol for forming the rigid polyurethane is selected from the group consisting of:
   polyether polyol having functionalities of 2-8 and hydroxyl value of 20-800 which is formed by employing propylene glycol, ethylene glycol, glycerin, trimethylolpropane, pentaerythritol, sucrose, sorbitol, ethylenediamine or tolylene diamine as the raw materials; and
   polyester polyol having a main chain obtained by the condensation polymerization of adipic acid and/or phthalic anhydride with ethylene glycol, propylene glycol, glycerin, trimethylolpropane, 1,4-butandiol, 1,6-hexylene glycol, pentanediol, said polyester polyol have a functionality of 2-4 and a hydroxyl value of 50-500.

4. The polyurethane composite of claim 3, wherein said polyether polyol having a main chain structure of polypropylene oxide, said polypropylene oxide structure comprises 10-20% of polyethylene oxide segments, or said polypropylene oxide structure is terminated by polyethylene oxide chain segments in an amount of 10-20%.

5. The polyurethane composite of claim 1, wherein the diisocyanate used for forming said flexible integral polyurethane foam is selected from the group consisting of 2,4-toluene diisocyanate, 2,6-toluene diisocyanate, diphenylmethane diisocyanate, the modified products of diphenylmethane diisocyanate having NCO content of from 24% to 33%, and a mixture of diphenylmethane diisocyanate and toluene diisocyanate having NCO content of from 26% to 42%;
   the polyol used for forming the flexible integral polyurethane foam has a functionality of 2-4, a hydroxyl value of 18-60, and a main chain structure of polypropylene oxide incorporated with 10-20% of polyethylene oxide segments or terminated by polyethylene oxide chain segments in an amount of 10-20%.

6. The polyurethane composite of claim 1, wherein the polyol used for forming the flexible integral polyurethane foam is a polyol grafted with more than one monomer, the functionality thereof is 2-4, a hydroxyl value is 18-25 and a solid content is 20-46%.

7. A bicycle saddle made of the polyurethane composite of any one of claims 1-6.

8. A decorative material made of the polyurethane composite of any one of claims 1-6.

9. A method for producing the polyurethane composite of any one of claims 1-6, comprising the following steps:
   1) forming the liner of rigid polyurethane in an upper die of a composite mould;
   2) adding into a lower die of the composite mould a mixture of diisocyanate, polyol and blowing agent used for forming the flexible polyurethane foam;
   3) closing the composite mould to allow the flexible polyurethane foam to directly foam on the surface of the liner of the rigid polyurethane.

10. The polyurethane composite of claim 1, wherein the rigid polyurethane has a density of from 900 kg/m³ to 1200 kg/m³, a Shore A hardness of from 92 to 99, a Shore D hardness of from 50 to 80, a tensile strength of from 20 MPa to 60 MPa, an elongation at break of from 10% to 100%; a flexural strength of from 20 MPa to 60 Mpa; and an elastic flexural modulus of from 800 to 2500 MPa;
   the flexible integral polyurethane foam has a density of from 70 kg/m³ to 150 kg/m³, a tensile strength of from 80 kPa to 200 kPa, an elongation rate at break of from 87% to 160%, a tearing strength of from 150 N/m to 200 N/m, a resilience of falling ball of from 50% to 65%, IFD25% of from 300 N to 600 N and IFD65% of from 900 N to 1700 N.

11. The polyurethane composite of claim 10, wherein the rigid polyurethane has an elongation at break of from 10% to 25%.

12. The polyurethane composite of claim 10, wherein the polyisocyanate and polyol are present in the rigid polyurethane is in a molar ratio of 105-130:100.

13. The polyurethane composite of claim 10, wherein the polyisocyanate for forming the rigid polyurethane is selected from the group consisting of 2,4-toluene diisocyanate, 2,6-toluene diisocyanate, hexamethylene diisocyanate, tetramethylene diisocyanate, naphthalene diisocyanate, 4,4'-diphenylmethane diisocyanate, and the modified products of the diphenylmethane diisocyanate having NCO content of from 18% to 33.6%;
the polyol for forming the rigid polyurethane is selected from the group consisting of:
polyether polyol having functionalities of 2-8 and hydroxyl value of 20-800 which is formed by employing propylene glycol, ethylene glycol, glycerin, trimethylolpropane, pentaerythritol, sucrose, sorbitol, ethylenediamine or tolylene diamine as the raw materials; and
polyester polyol having a main chain obtained by the condensation polymerization of adipic acid and/or phthalic anhydride with ethylene glycol, propylene glycol, glycerin, trimethylolpropane, 1,4-butandiol, 1,6-hexylene glycol, pentanediol, said polyester polyol have a functionality of 2-4 and a hydroxyl value of 50-500.

14. The polyurethane composite of claim 13, wherein said polyether polyol having a main chain structure of polypropylene oxide, said polypropylene oxide structure comprises 10-20% of polyethylene oxide segments, or said polypropylene oxide structure is terminated by polyethylene oxide chain segments in an amount of 10-20%.

15. The polyurethane composite of claim 10, wherein the diisocyanate used for forming said flexible integral polyurethane foam is selected from the group consisting of 2,4-toluene diisocyanate, 2,6-toluene diisocyanate, diphenylmethane diisocyanate, the modified products of diphenylmethane diisocyanate having NCO content of from 24% to 33%, and a mixture of diphenylmethane diisocyanate and toluene diisocyanate having NCO content of from 26% to 42%;
the polyol used for forming the flexible integral polyurethane foam has a functionality of 2-4, a hydroxyl value of 18-60, and a main chain structure of polypropylene oxide incorporated with 10-20% of polyethylene oxide segments or terminated by polyethylene oxide chain segments in an amount of 10-20%.

16. The polyurethane composite of claim 10, wherein the polyol used for forming the flexible integral polyurethane foam is a polyol grafted with more than one monomer, the functionality thereof is 2-4, a hydroxyl value is 18-25 and a solid content is 20-46%.

17. A bicycle saddle made of the polyurethane composite of any one of claims 12-16.

18. A decorative material made of the polyurethane composite of any one of claims 12-16.

19. A method for producing the polyurethane composite of any one of claims 12-16, comprising the following steps:
1) forming the liner of rigid polyurethane in an upper die of a composite mould;
2) adding into a lower die of the composite mould a mixture of diisocyanate, polyol and blowing agent used for forming the flexible polyurethane foam;
3) closing the composite mould to allow the flexible polyurethane foam to directly foam on the surface of the liner of the rigid polyurethane.

* * * * *